(12) United States Patent
Cheng et al.

(10) Patent No.: US 6,891,504 B2
(45) Date of Patent: May 10, 2005

(54) DUAL-BAND ANTENNA

(75) Inventors: Pih-Si Cheng, Hsinchu (TW); Huey-Jen Lin, Hsinchu (TW)

(73) Assignee: Wistron Neweb Corporation, Taipei Hsien (TW)

( * ) Notice: Subject to any disclaimer, the term of this patent is extended or adjusted under 35 U.S.C. 154(b) by 28 days.

(21) Appl. No.: 10/671,942

(22) Filed: Sep. 29, 2003

(65) Prior Publication Data

US 2005/0035911 A1 Feb. 17, 2005

(30) Foreign Application Priority Data

Apr. 1, 2003 (TW) ........................ 92205099 U

(51) Int. Cl.⁷ .............................. H01Q 1/38; H01Q 1/24
(52) U.S. Cl. ................... 343/700 MS; 343/702
(58) Field of Search ................... 343/700 MS, 702, 343/846, 848, 725, 729; H01Q 1/38, 1/24

(56) References Cited

U.S. PATENT DOCUMENTS

| | | | |
|---|---|---|---|
| 5,585,810 A | 12/1996 | Tsuru et al. | |
| 5,598,174 A | 1/1997 | Erkocevic et al. | |
| 6,166,694 A | 12/2000 | Ying | |
| 6,339,400 B1 | 1/2002 | Flint et al. | |
| 6,380,898 B1 | 4/2002 | Moore et al. | |
| 6,404,394 B1 | 6/2002 | Hill | |
| 6,407,710 B2 | 6/2002 | Keilen et al. | |
| 6,408,190 B1 | 6/2002 | Ying | |
| 6,414,641 B1 | 7/2002 | Carlson et al. | |
| 6,414,642 B2 | 7/2002 | Honda et al. | |
| 6,476,769 B1 | 11/2002 | Lehtola | |
| 6,515,627 B2 * | 2/2003 | Lopez et al. | 343/700 MS |
| 6,812,892 B2 * | 11/2004 | Tai et al. | 343/700 MS |
| 2003/0103010 A1 * | 6/2003 | Boyle | 343/702 |
| 2003/0103014 A1 * | 6/2003 | Birnbaum et al. | 343/841 |

* cited by examiner

Primary Examiner—Hoanganh Le
(74) Attorney, Agent, or Firm—Birch, Stewart, Kolasch & Birch, LLP.

(57) ABSTRACT

The present invention provides a dual-band inverted-F antenna configured for portable electronic devices having wireless communication function. The antenna includes a first planar conductive element and a second planar conductive element. The first planar conductive element, with an L-shaped design, has a feed point for transmitting received signals to the portable electronic devices. The second planar conductive element, a rectangular board, is orthogonal to the first planar conductive element and is connected to the first planar conductive element at a node. The node formally separates the second planar conductive element into two parts to receive two different frequency signals respectively.

17 Claims, 7 Drawing Sheets

DUAL-BAND ANTENNA

This nonprovisional application claims priority under 35 U.S.C. § 119(a) on Patent Application No. 092205099 filed in Taiwan on Apr. 1, 2003, which is herein incorporated by reference.

This Application claims priority to Taiwan Patent Application No. 092205099 filed on Apr. 1, 2003.

FIELD OF INVENTION

This present invention relates generally to an antenna and, more specifically, to a dual-band inverted-F antenna that is applied to portable electronic devices with wireless communication function.

BACKGROUND OF THE INVENTION

It is known that people utilize more and more wireless portable devices; therefore, many of these devices configured with dual-band antennas appear on the market for people to choose from.

In order to carry around easily, these devices are usually designed small in physical size. The small physical size limits the shapes of dual-band antennas so that the antennas for portable electronic devices need to compromise between function and physical size. FIG. 1 shows a dual-band antenna of the prior art with a first receiving input 101 and a second receiving input 103. Both of them have a long strip shape structure whose length corresponds to receiving frequencies. The portable electronic device receives signals through a feed point 105. The antenna of the prior art is designed flat to fit into the limited space; however, such design might influence receiving efficiency.

SUMMARY OF THE INVENTION

An aspect of the present invention is to provide a dual-band inverted-F antenna with good receiving quality, and to fit in the limited physical sizes of the portable electrical devices.

A dual-band inverted-F antenna in accordance with the present invention includes a first planar conductive element, a second planar conductive element, a planar ground element, a planar base and a connection element. The first planar conductive element and the second planar conductive element, orthogonal to each other, are configured to transmit received signals to a portable electronic device. The second planar conductive element, having a rectangular shape, includes a first part and a second part to receive signals of a first and second frequency respectively. The planar ground element, orthogonal to the second planar conductive element, is connected to ground. The planar base, orthogonal to the second planar conductive element as well, fixes the dual-band antenna on the portable device. The connection element connects the first planar conductive element and the planar ground element to the planar base.

The first planar conductive element and the second planar conductive element are connected at a node located at an intersection point of the first part and the second part. The first part contains a first side with a length substantially equal to a quarter of a corresponding wavelength of the first frequency. The second part contains a second side with a length substantially equal to a quarter of a corresponding wavelength of the second frequency.

The first part and the second part of the present invention can be separated with a gap for better receiving efficiency.

DETAILED DESCRIPTION

The present invention discloses a dual-band inverted-F antenna installed in a portable electronic device with wireless communication function, such as a portable computer, a personal digital assistants (PDA), etc. This antenna can receive signals of two different frequency bands. For convenience, the specification uses the central frequencies, a first and a second frequency, to represent the two frequency bands unless otherwise declared.

The present invention includes a first planar conductive element and a second planar conductive element. The second planar conductive element, orthogonal to the first planar conductive element, includes a first part and a second part. The first part is configured to receive signals of the first frequency, and the second part is configured to receive signals of the second frequency. The first and the second planar conductive elements are connected at a node located at an intersection point of the first and the second parts. The first part of the second planar conductive element includes a first side whose length is designed to substantially equal to a quarter of a corresponding wavelength of the first frequency for the best efficiency. The second part of the second planar conductive element includes a second side whose length is also designed to substantially equal to a quarter of a corresponding wavelength of the second frequency for the same reason.

Figure 1:
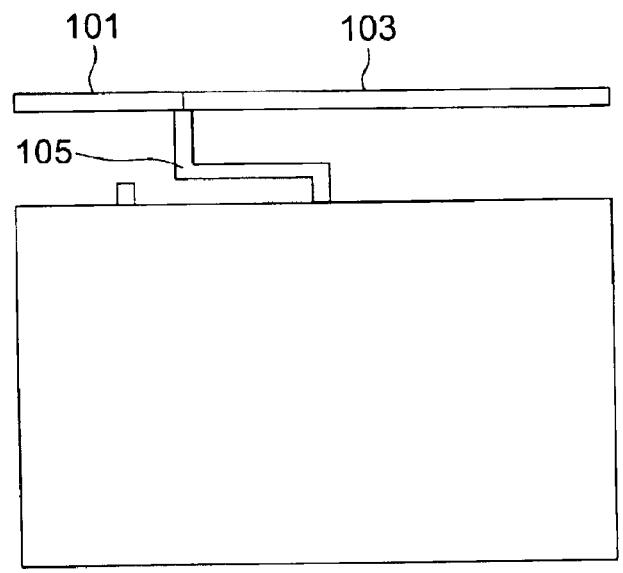
FIG. 1 illustrates a dual-band antenna of the prior art.
Figure 2:
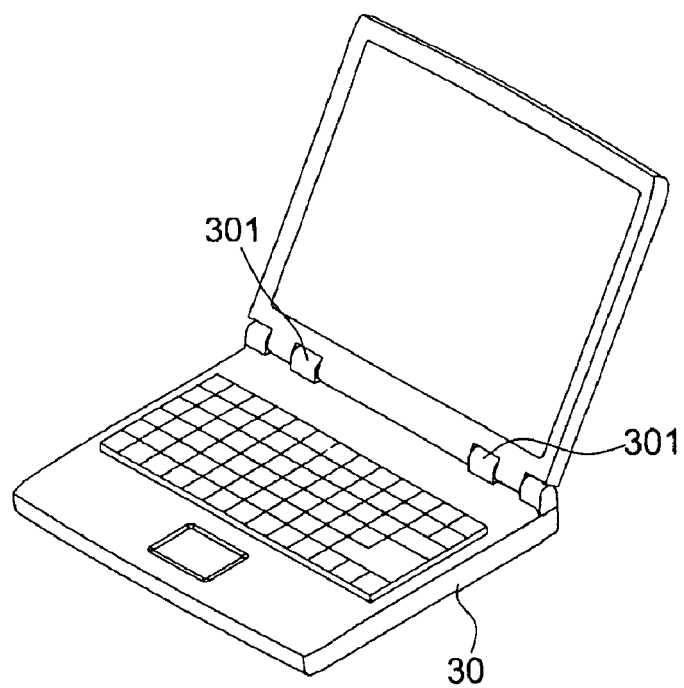
FIG. 2 illustrates a portable computer.
Figure 3A:
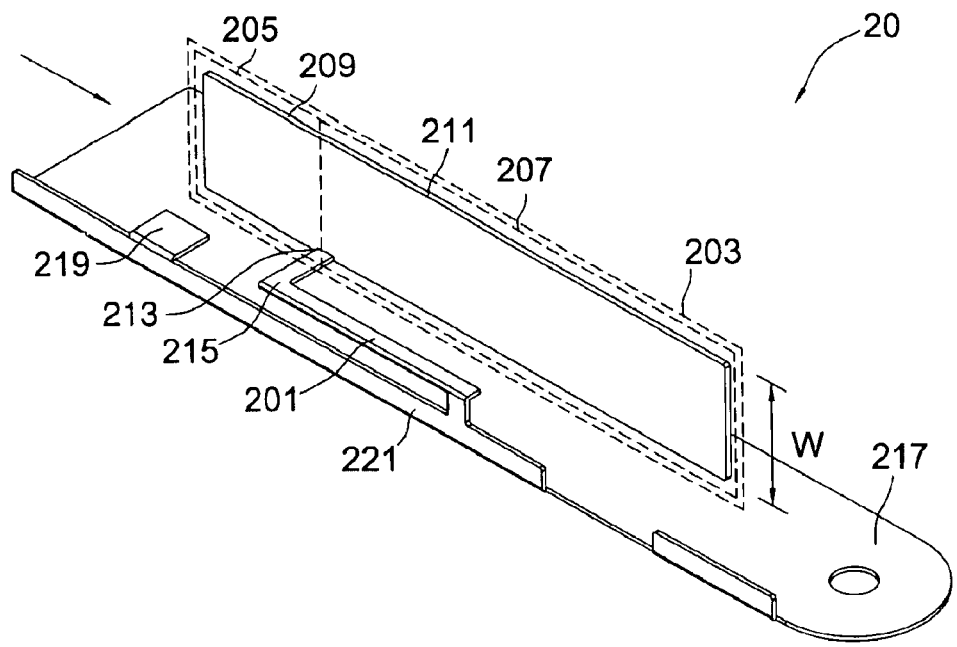
FIG. 3A illustrates the first embodiment of the present invention.

Referring to FIG. 2, the dual-band antenna is installed in the hinge site 301 of a portable computer 30. Generally speaking, one dual-band antenna has entire ability to receive signals well, but a portable computer usually installs two antennas in both hinge sites to maintain the performance of signal receiving if one of the antennas is malfunction. Referring to FIG. 3A, the dual-band antenna 20 includes a first planar conductive element 201 and a second planar conductive element 203. The second planar conductive element 203 is orthogonal to the first planar conductive element 201 and includes a first part 205 and a second part 207. The first part 205 is configured to receive signals of the first frequency, and the second part 207 is configured to receive signals of the second frequency.

The first planar conductive element 201 and the second planar conductive element 203 are connected at a node 213. The node 213 is located at an intersection point of the first part 205 and the second part 207. The second planar conductive element 203 has a rectangular shape, and so do the first part 205 and the second part 207. Moreover, the width W of the second planar conductive element 203 also influences the receiving frequencies. In order to fit the dual-band antenna 20 into the portable computer 30 with limited space, the first side 209, the second side 211 and the width W of the second planar conductive element 203 need adjusting coordinately to receive the first frequency and the second frequency, as well as to fit the antenna 20 into the limited room of the portable computer 30.

The first planar conductive element 201 has an L-shape structure and includes a feed point 215 located at a bending point of the L-shape structure. The feed point 215 is connected to a coaxial cable to transmit received signals to the portable computer 30.

The dual-band antenna 20 further includes a planar base 217, a planar ground element 219 and a connection element 221. The planar base 217, orthogonal to the second planar conductive element 203, is configured to fix the dual-band antenna 20 in the hinge site 301 of the portable computer 30. The planar ground element 219, orthogonal to the second planar conductive element 203 as well, is connected to the ground end (not shown) of the coaxial cable. The connection element 221 is configured to connect the first planar conductive element 201 and the planar ground element 219 to the planar base 217.

Figure 3B:
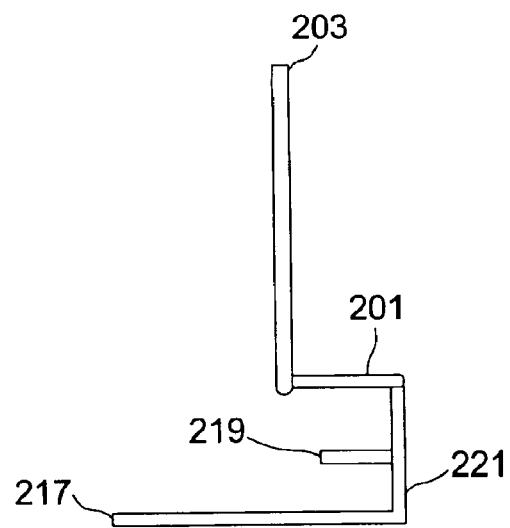
FIG. 3B illustrates a side view of the first embodiment of the present invention.

FIG. 3B is the side view of FIG. 3A along the arrow direction. The corresponding relations among each component can be realized according to FIG. 3A and FIG. 3B.

This antenna is designed according to the regulations of Wireless LAN IEEE 802.11a and 802.11b in which the central frequency of 802.11a is defined to be 5.25 GHz and the central frequency of 802.11b is defined to be 2.45 GHz. Therefore, the first embodiment of the present invention defines the first frequency as 5.25 GHz and the second frequency as 2.45 GHz. The corresponding wavelengths of the first frequency and the second frequency are 5.7 cm and 12.2 cm respectively. Based on the above description, the length of the first side 209 of the first part 205 should be one quarter of 5.7 cm, i.e. about 1.4 cm, and the length of the second side 211 of the second part 207 should be one quarter of 12.2 cm, i.e. about 3 cm to reach the best receiving efficiency. However, in order to fit into the limited space of the hinge site 301, the length of the first side 209 is adjusted to be 0.4 cm, the length of the second side 211 is adjusted to be 1.7 cm, and then the width W is adjusted to be 0.9 cm.

Figure 4:
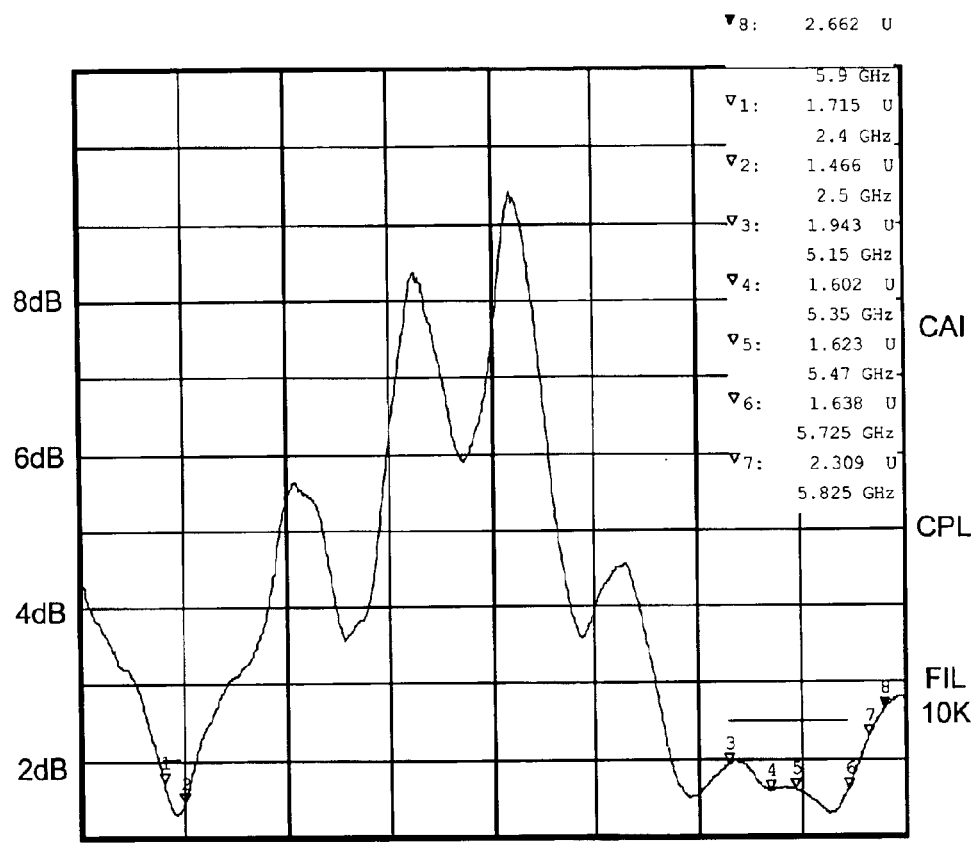
FIG. 4 illustrates a voltage standing wave ratio chart of the first embodiment of the present invention.

FIG. 4 shows a test result chart of a Voltage Standing Wave Ratio (VSWR) of the first embodiment. Generally speaking, VSWR under 2 dB is considered having good receiving quality. As shown in FIG. 4, the frequency band between mark 1 and mark 2 is the defined frequency band of 802.11b (2.4 GHz ~2.5 GHz), and the frequency band between mark 3 and mark 6 is the defined frequency band of 802.11a (5.15 GHz~5.725 GHz). The VSWRs of the two are smaller than 2 dB so the efficiency for receiving the frequencies under Wireless LAN IEEE 802.11a and 802.11b is excellent.

Figure 5A:
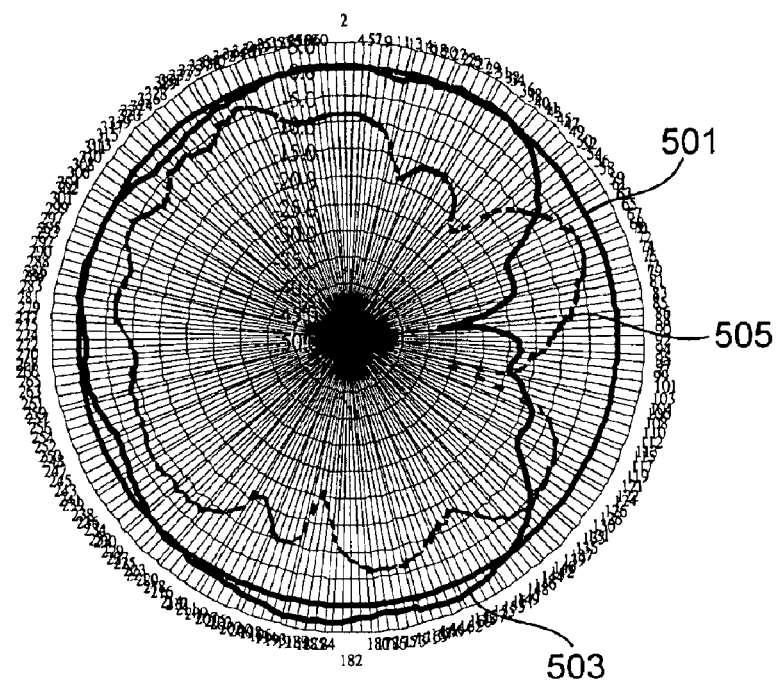
FIG. 5A illustrates a gain pattern chart at 2.45 GHz of the first embodiment of the present invention.
Figure 5B:
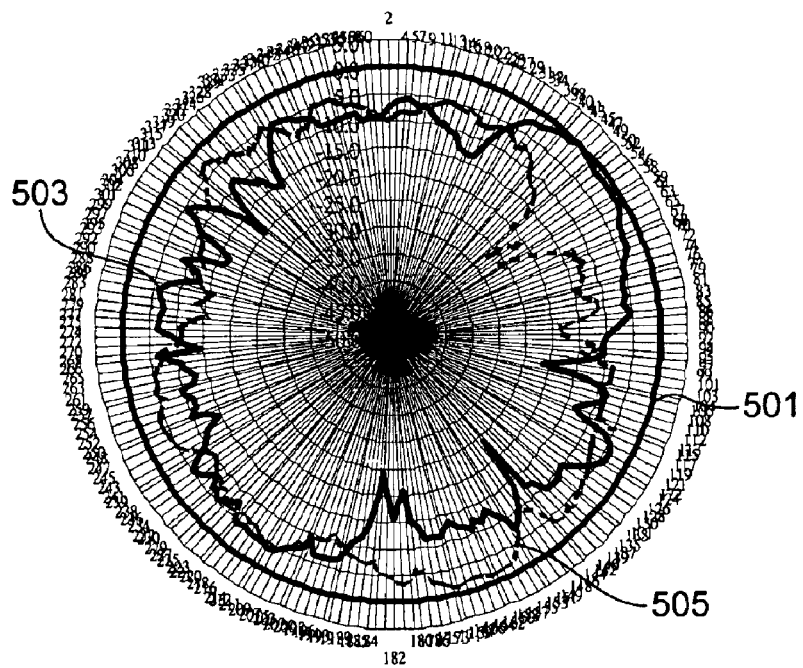
FIG. 5B illustrates a gain pattern chart at 5.25 Ghz of the first embodiment of the present invention.

FIG. 5A and FIG. 5B show the gain pattern charts when the first embodiment receives the second frequency 2.45 GHz and the first frequency 5.25 GHz. The isotropic antenna gain 501 is the standard gain value so that the real gains should be as close to the isotropic antenna gain 501 as possible. Larger or smaller gains might influence receiving quality or disturb other electronic components. As shown in FIG. 5A and FIG. 5B, the vertical-polarized gain 503 and the horizontal-polarized gain 505 of the first embodiment are very close to the isotropic antenna gain 501.

Figure 6:
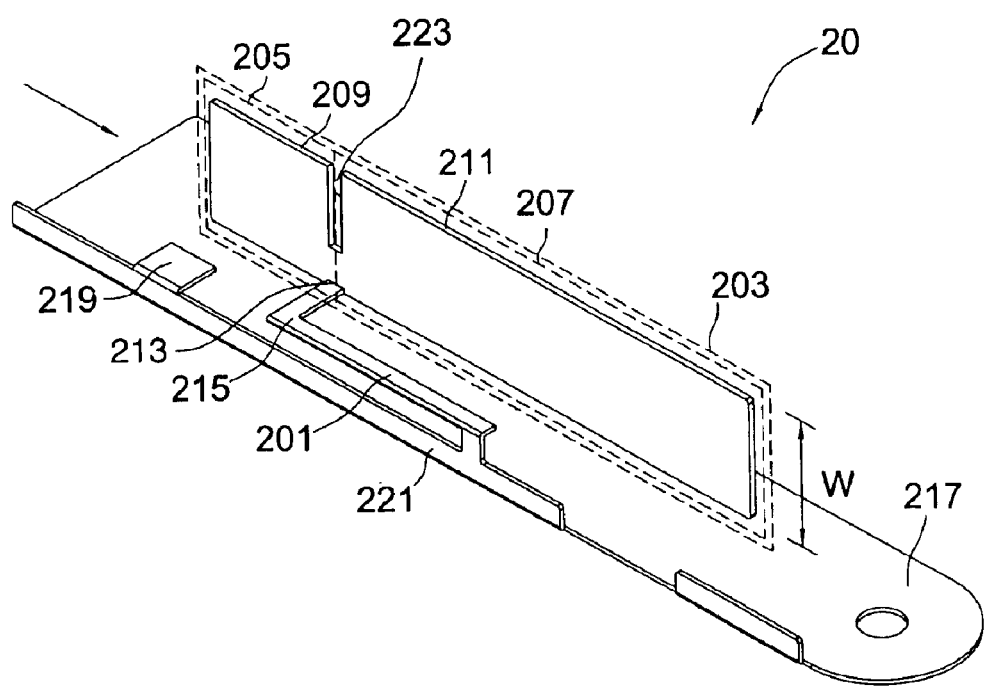
FIG. 6 illustrates the second embodiment of the present invention.

FIG. 6 shows a second embodiment of the present invention. The second embodiment is also configured to receive the frequencies under the regulation of the Wireless LAN IEEE 802.11a and 802.11b. The second planar conductive element 203 of the second embodiment, different from that of the first embodiment, includes a gap 223 located between the first part 205 and the second part 207 to separate the first part 205 and the second part 207.

Figure 7:
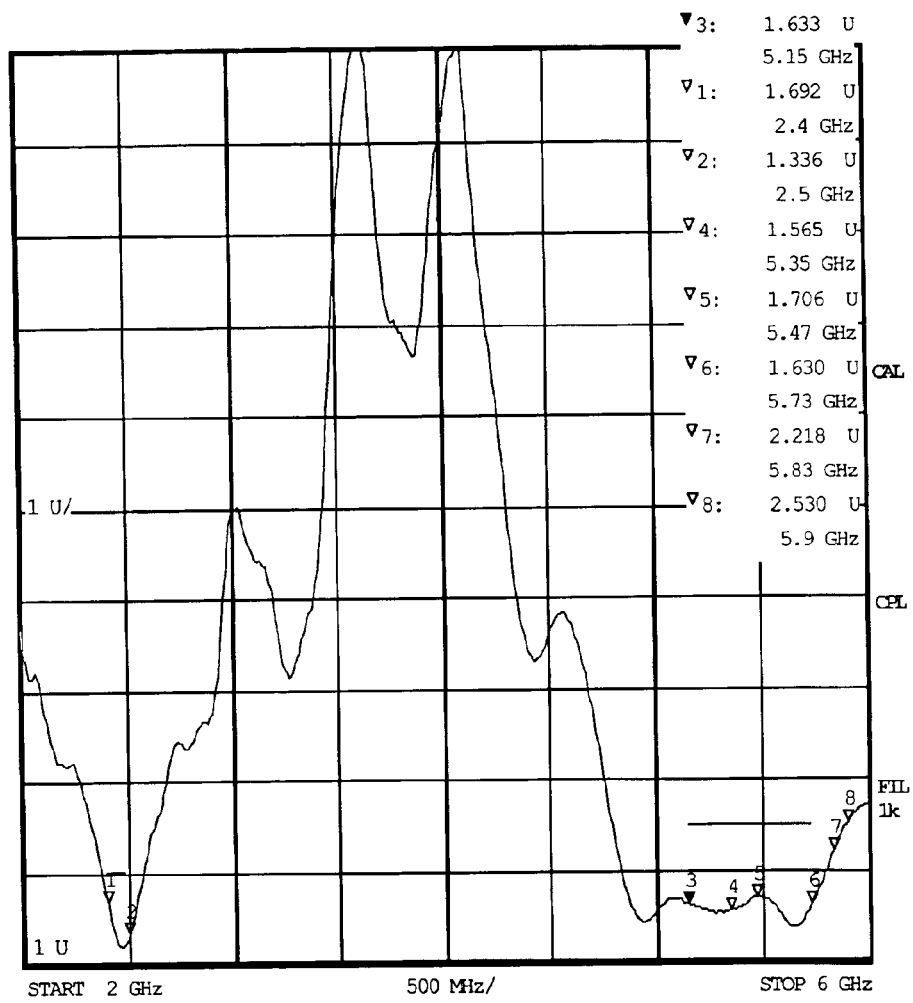
FIG. 7 illustrates a voltage standing wave ratio chart of the second embodiment of the present invention.
Figure 8A:
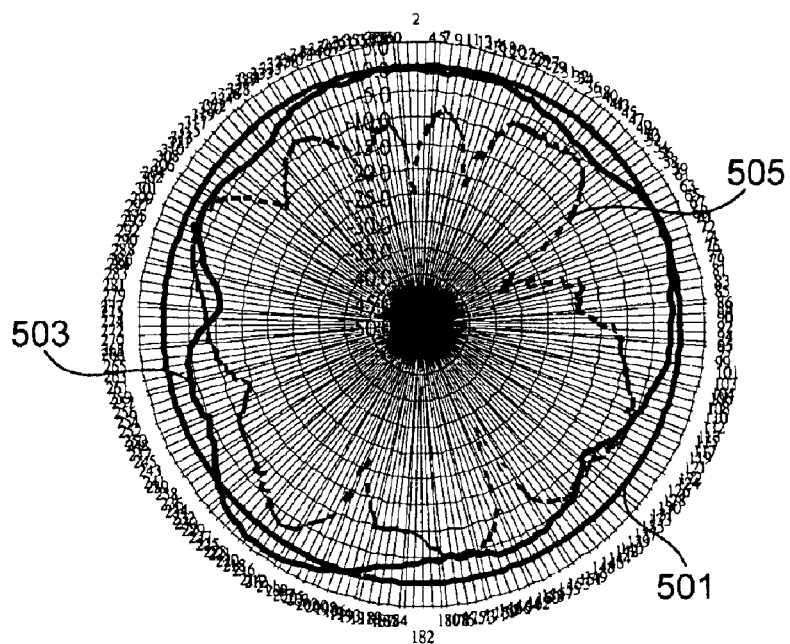
FIG. 8A illustrates a gain pattern chart at 2.45 Ghz of the second embodiment of the present invention.
Figure 8B:
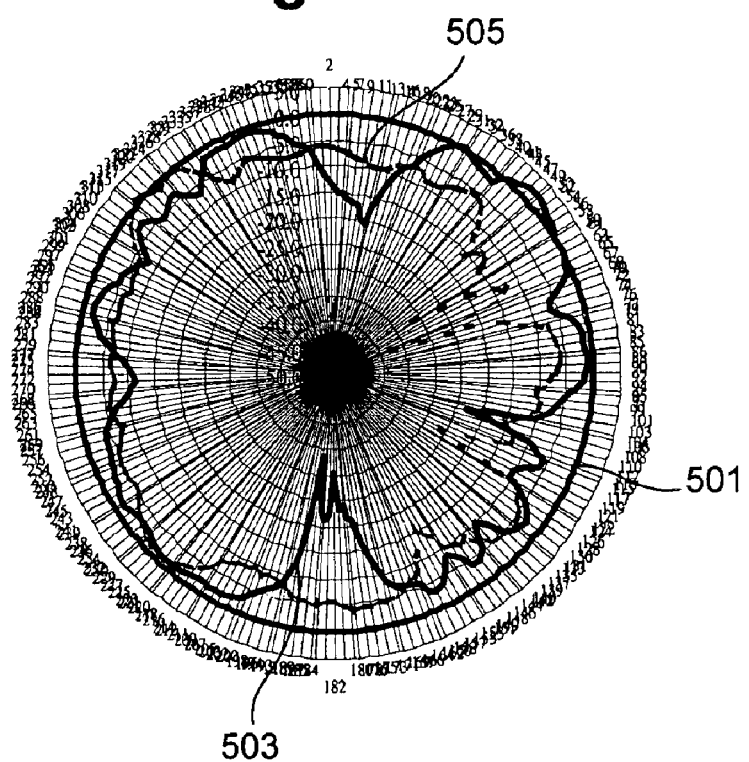
FIG. 8B illustrates a gain pattern chart at 5.25 Ghz of the second embodiment of the present invention.

FIG. 7 is the VSWR chart of the second application of the present invention. The VSWR of the second embodiment, comparing with that of the first embodiment, has lower dB values, especially at the frequency 5.15 GHz of mark 3. FIG. 8A and FIG. 8B are the gain pattern charts when the second embodiment receives signals of the second frequency 2.45 GHz and the first frequency 5.25 GHz. Comparing with FIG. 5A and FIG. 5B, one can realize that the receiving gains of the second embodiment at most angles are better than those of the first embodiment.

Based on the aforementioned description, the antenna of the present invention can maintain receiving quality well even if the dimensions of the antenna are adjusted to fit the physical sizes of a portable electronic device. Although the specification only takes 2.45 GHz and 5.25 GHz as examples, signals of other frequencies can be also received as long as minor dimension modification of the second planar conductive element is made. Accordingly, the above description of the embodiments is expected to clearly expound the characteristics of the present invention but not expected to restrict the scope of the present invention. The above disclosure should be construed as limited only by the bounds of the claims.

What is claimed is:

1. A dual-band antenna for receiving signals of a first frequency and a second frequency, said antenna comprising:
    a first planar conductive element; and
    a second planar conductive element, orthogonal to the first planar conductive element, comprising a first part and a second part, the first part comprising a first side and the second part comprising a second side;
    wherein, the first part is configured to receive signals of the first frequency, the second part is configured to receive signals of the second frequency, the first and the second planar conductive elements are connected at a node, the node is located at an intersection point of the first and the second parts, a length of the first side substantially equals to a quarter of a corresponding wavelength of the first frequency, and a length of the second side substantially equals to a quarter of a corresponding wavelength of the second frequency.

2. The dual-band antenna of claim 1, wherein the first part and the second part respectively have a rectangular shape.

3. The dual-band antenna of claim 2, wherein the second planar conductive element further comprises a gap located between the first part and the second part.

4. The dual-band antenna of claim 2, wherein the first planar conductive element has a L-shaped structure and comprises a feed point located at a bending point of the L-shaped structure.

5. The dual-band antenna of claim 4, wherein the dual-band antenna further comprises:
    a planar base, orthogonal to the second planar conductive element, for fixing the dual-band antenna on a device;
    a planar ground element orthogonal to the second planar conductive element; and
    a connection element for connecting the first planar conductive element and the planar ground element to the planar base.

6. The dual-band antenna of claim 3, wherein the first planar conductive element has an L-shaped structure and comprises a feed point located at a bending point of the L-shaped structure.

7. The dual-band antenna of claim 6, wherein the dual-band antenna further comprises:
- a planar base, orthogonal to the second planar conductive element, for fixing the dual-band antenna on a device;
- a planar ground element orthogonal to the second planar conductive element; and
- a connection element for connecting the first planar conductive element and the planar ground element to the planar base.

8. A dual-band antenna for receiving signals of a first frequency and a second frequency, comprising:
- a first planar conductive element;
- a second planar conductive element, orthogonal to the first planar conductive element, comprising a first part and a second part, the first part being configured to receive signals of the first frequency and comprising a first side, the second part being configured to receive signals of the second frequency and comprising a second side;
- a planar base, orthogonal to the second planar conductive element, for fixing the dual-band antenna on a device;
- a planar ground element orthogonal to the second planar conductive element; and
- a connection element for connecting the first planar conductive element and the planar ground element to the planar base;
- wherein, the first and the second planar conductive elements are connected at a node, the node is located at an intersection point of the first and the second parts, a length of the first side substantially equals to a quarter of a corresponding wavelength of the first frequency, and a length of the second side substantially equals to a quarter of a corresponding wavelength of the second frequency.

9. The dual-band antenna of claim 8, wherein the first and the second parts respectively have a rectangular shape.

10. The dual-band antenna of claim 9, wherein the second planar conductive element further comprises a gap located between the first and the second parts.

11. The dual-band antenna of claim 9, wherein the first planar conductive element has an L-shaped structure and comprises a feed point located at a bending point of the L-shaped structure.

12. The dual-band antenna of claim 10, wherein the first planar conductive element has an L-shaped structure and comprises a feed point located at a bending point of the L-shaped structure.

13. An electronic device with a wireless communication function, comprising:
- a dual-band antenna for receiving signals of a first frequency and a second frequency, comprising:
  - a first planar conductive element;
  - a second planar conductive element, orthogonal to the first planar conductive element, comprising a first part and a second part, the first part comprising a first side, the second part comprising a second side; and
  - a planar ground element orthogonal to the second planar conductive element;
- a planar base, orthogonal to the second planar conductive element, for fixing the dual-band antenna on the electronic device; and
- a connection element for connecting the first planar conductive element and the planar ground element to the planar base;
- wherein, the first and the second planar conductive elements are connected at a node, the node is located at an intersection point of the first and the second parts, a length of the first side substantially equals to a quarter of a corresponding wavelength of the first frequency, and a length of the second side substantially equals to a quarter of a corresponding wavelength of the second frequency.

14. The electronic device of claim 13, wherein the first and the second parts respectively have a rectangular shape.

15. The electronic device of claim 14, wherein the second planar conductive element further comprises a gap located between the first and the second parts.

16. The electronic device of claim 14, wherein the first planar conductive element has an L-shaped structure and comprises a feed point positioned at a bending point of the L-shaped structure.

17. The electronic device of claim 15, wherein the first planar conductive element has an L-shaped structure and comprises a feed point positioned at a bending point of the L-shaped structure.

* * * * *